United States Patent Office 2,825,712
Patented Mar. 4, 1958

2,825,712

MODIFIED AROMATIC HYDROCARBON-ALDEHYDE RESINS

John M. Witzel, Saratoga, N. Y., assignor to General Electric Company, a corporation of New York No Drawing. Application March 8, 1954
Serial No. 414,861

15 Claims. (Cl. 260—43)

This invention relates to the production of new and improved resinous compositions comprising aromatic hydrocarbon-aldehyde resins eminently suitable in coating compositions, varnishes, as binders for laminates, in molding compositions, as casting resins, etc.

The new and improved resinous compositions of the present invention comprise the products obtained by reacting the reaction product of an aromatic hydrocarbon and an aldehyde, said reaction product believed to have the general formula

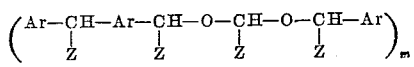

wherein Ar represents aromatic hydrocarbon radicals such as xylyl-, naphthyl-, alkylated naphthyl-, anthracyl-, alkylated anthracyl-, meistylyl-, etc., and Z represents a member selected from the group consisting of hydrogen, alkyl, alkaryl, aralkyl, and heterocyclic oxygen-containing radicals, i. e., furfuryl- where the aldehyde employed is furfural, and $m$ is an integer greater than one, i. e., 1 to 20, with ($a$) an ether derivative of a methylol phenol having the general formula

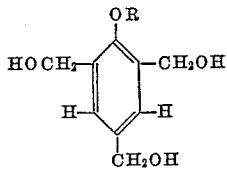

wherein R represents a saturated or an unsaturated aliphatic hydrocarbon radical or ($b$) with a low molecular weight phenolic resin comprising a mixture of compound ($a$) and compounds corresponding to the general formula

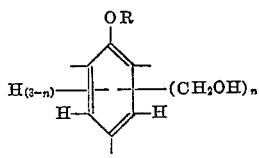

where R has the meaning given above, and $n$ is an integer equal to from 1 to 2, inclusive, or ($c$) with a complex epoxide resin comprising a polyether derivative of a polyhydric organic compound, e. g., a polyhydric alcohol ether, in which the said polyether derivative contains epoxy groups, which for brevity will hereinafter be referred to as an "ethoxyline resin."

Also included within the scope of this invention are novel compositions of matter obtained by co-condensing a phenol-modified aromatic hydrocarbon-aldehyde resin with one of the above compounds or a mixture thereof.

Additional compositions included within the scope of this invention are compositions of matter produced by the co-reaction of the previously described aromatic hydrocarbon-aldehyde resins with varying amounts of ($a$) and ($c$) or ($b$) and ($c$) to give terpolymers which are systems composed of three structural units, for example, an aromatic hydrocarbon-aldehyde resin, a low molecular weight phenolic resin in which the hydrogen or the hydroxyl groups is partially or wholly substituted by a hydrocarbon radical, and an ethoxyline resin.

Of the above compositions, ($b$) is representative of a low molecular weight phenolic resin in which the hydroxyl groups are partially or wholly blocked by a hydrocarbon radical, for example, an allyl radical. It may comprise a mixture of ethers of polymethylol phenols represented by ($a$) and ($b$), as more fully described in Martin Patents 2,579,330 and 2,579,331 assigned to the assignee of the present invention. Since the production of mixed allyl ethers of polymethylol phenols in accordance with the Martin patent is accompanied by the production of a complex mixture of numerous other compounds and the entire reaction mixture employed in the instant processes without separation of any component thereof, the composition hereinafter described as mixed allyl ethers of polymethylol phenols represents the entire reaction product obtained by following the Martin procedure. More particularly, such a composition may be obtained by following the process of Example 13, as described in this patent, in which the mole ratio of formaldehyde to phenol may be varied between 1.5 to 3.0 moles per mole of phenol and then reacted with the desired amount of allyl chloride to yield varying ratios of allyl ethers of the phenol nucleus and ring allylated derivatives. Thus, not all of the phenolic hydroxyl is necessarily blocked.

Ethoxyline resins of the type herein disclosed are described more fully in Castan Patent 2,324,483, Castan Patent 2,444,333, British Patent 518,057 and British Patent 579,698. Essentially these ethoxyline resins are based on the resinous product of reaction between an epihalogenohydrin, for instance epichlorohydrin and an aliphatic polyhdric alcohol, for example, glycerine or a phenol having at least two phenolic hydroxy groups, for example, bis-(4-hydroxy-phenyl) dimethylmethane. Further examples of ethoxyline resins which may be employed in the practice of the present invention are disclosed in U. S. Patents 2,494,295; 2,500,600 and 2,511,913. By reference the aforementioned patents are intended to be part of the present description of the ethoxyline resins used and, for brevity, the ethoxyline resins will not be described other than that they contain more than one epoxide group, e. g., from one to two or more epoxide groups per molecule and may be prepared by effecting reaction between a phenol or polyhydric alcohol, for example, phenol, hydroquinone, resorcinol, glycerine and condensation products of phenols with ketones, for instance, bis-(4-hydroxyphenyl) dimethylmethane, with epichlorohydrin. For example, the reaction of epichlorohydrin with bis-(4-hydroxylphenyl) dimethylmethane may be formulated as follows:

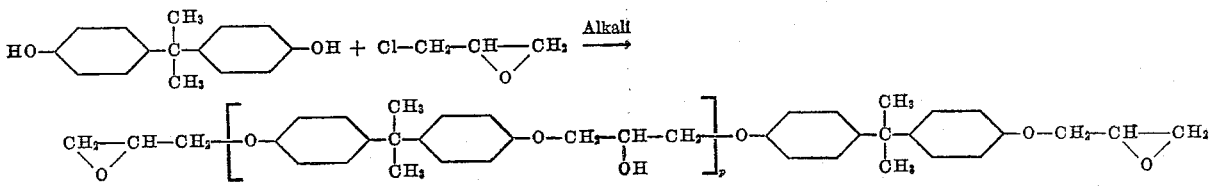

where $p$ has an average value varying from around 3 to about 10. Many of these ethoxyline resins are sold under the name of Epon resins, or Araldite resins. Data on several of the Epon resins found eminently suitable for the instant purpose are given in the table below:

TABLE I

| Epon No. | Epoxide equivalent | Approximate esterification equivalent | M. P., °C. |
|---|---|---|---|
| RN-34 | 225– 290 | 105 | 20–28. |
| RN-48 | 192 | 80 | 9. |
| 1064 | 300– 375 | 105 | 40–45. |
| 1062 | 140– 165 | | Liquid. |
| 1004 | 905– 985 | 175 | 97–103. |
| 1007 | 1,600–1,900 | 190 | 127–133. |
| 1009 | 2,400–4,000 | 200 | 145–155. |
| 1001 | 450– 525 | 130 | 64–76. |

Ether derivatives of the methylol phenols co-condensable with aromatic hydrocarbon-aldehyde resins include, for example, 1-allyloxy-2,4,6-(hydroxymethyl) benzene or a composition comprising a mixture of allyloxy hydroxymethyl-substituted benzenes, for example, the reaction mixture comprising mixed allyloxy hydroxymethyl benzenes prepared in accordance with the process disclosed in the aforementioned Martin Patent 2,579,330. In addition to the allyl ethers, also included within the scope of this invention as co-condensable with aromatic hydrocarbon-aldehyde resins are the previously described ethers of polymethylol phenols represented by the general formula

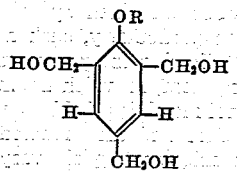

wherein R is a hydrocarbon radical selected from the group consisting of methyl, ethyl, propyl, butyl, etc. radicals, and unsaturated aliphatic radicals, for example, methallyl, crotyl, butenyl, etc., as well as mono- and polyhalogenated derivatives, of the aforesaid unsaturated aliphatic groups, for example, 2-chlorallyl, 3-chlorallyl, 3-chloro-2-methylallyl, 1-chloro-2-butenyl, etc. groups. The halogen may also be bromine, fluorine, etc. Similarly, the alkyl groups may be halogen substituted. Additionally, I may employ a mixture of the last mentioned polymethylol phenols and compounds corresponding to the general formula

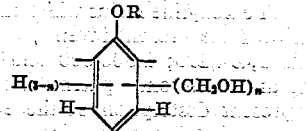

where R has the meaning given above and $n$ is an integer equal to from 1 to 2, inclusive.

Ethoxyline resins and polymethylol phenol ethers of the type described above have been used previously unmodified or modified with phenolic resins, for example, for various protective coating applications. However, the high cost of such coating materials makes them commercially unattractive in so competitive a field. I have now found that a substantial reduction in the cost of certain protective coating resins can be realized by utilizing compositions obtained by co-condensing low cost aromatic hydrocarbon-aldehyde resins or phenol-modified aromatic hydrocarbon-aldehyde resins with one of the aforementioned ethoxyline resins or resinous polymethylol phenol ethers or a mixture thereof. This discovery is completely unexpected since some aromatic hydrocarbon-aldehyde resins, for example, n-xylene-formaldehyde resins, are thermoplastic and consequently have limited use, particularly in the protective coating market. Although the reaction of these resins with phenol to serve as a cross-linking nucleus has been accomplished, the reaction suffers from the disadvantages of requiring excessively high temperature and being difficult to control. Moreover, the reaction results in the production of considerable quantities of gelled material which cannot be put to practical use. On the other hand, I have found that aromatic hydrocarbon-aldehyde resins or phenol-modified aromatic hydrocarbon-aldehyde resins react readily with polymethylol phenol ethers and with ethoxyline resins to yield thermosetting copolymers which are inexpensive to produce and which are extremely useful products for the protective coating industry, for example, for such end uses as can coatings, drum linings, corrosion and chemical resistant coatings for metals, etc.

The aromatic hydrocarbon-aldehyde resins included within the scope of this invention may be prepared in the manner hereinafter described. Additionally, they include the classes of aromatic hydrocarbon-aldehyde resins disclosed in German Patent 349,741, and U. S. Patents 2,568,313 and 2,350,230.

Aromatic hydrocarbons which may be reacted with aldehydes to produce the low cost aromatic hydrocarbon-aldehyde resins found eminently suitable in preparing the coating compositions of this invention include ortho-, meta-, and para-xylene individually, commercial xylene which is a mixture of the three xylenes plus a small percentage of ethylbenzene; naphthalene, alkyl-substituted naphthalenes, anthracene and its alkylated derivatives, etc.

Aldehydes which may be used to advantage in preparing the instant aromatic hydrocarbon-aldehyde resins include aldehydes which readily react with phenols to give phenol-aldehyde type resins and include aliphatic aldehydes, for example, formaldehyde, acetaldehyde, propionaldehyde, butyraldehyde, etc., aromatic aldehyde, for example, benzaldehyde, etc.; and heterocyclic oxygen containing aldehydes such as furfural, etc.

The quantities of ethoxyline resin and polymethylol phenol ethers employed in producing copolymers with the aromatic hydrocarbon-aldehyde are advantageously varied within certain limits. Generally, when preparing two component systems of the present invention, the aromatic hydrocarbon-aldehyde resin or phenol-modified aromatic hydrocarbon-aldehyde-resin may be employed in a range of from 30% to 70%, by weight, based on the combined weight of the two components, the balance being the second component, with a system of 50%, by weight of the components, of aromatic hydrocarbon-aldehyde resin to 50%, by weight of the components, of either the ethoxyline resin or polymethylol phenol ethers being preferred.

In preparing the terpolymers of the present invention, the proportions of ingredients may be varied widely. Generally, the aromatic hydrocarbon-aldehyde resin can be employed in an amount ranging from 30 to 70%, by weight, based on the total weight of the system, the balance being a mixture, in all proportions, of the polymethylol phenol ethers and the ethoxyline resin. Percentagewise, each of the components used in conjunction with the aromatic hydrocarbon-aldehyde resin may range from 1 to 69%, by weight, of the total system weight.

Although a wide range of temperature may be employed in producing the instant copolymers, generally it has been found that temperatures of the order of from 100° to 180° C. are preferred. Additionally, in some instances the components may be cold blended. Thus, the aromatic hydrocarbon-aldehyde resin-ethoxyline resin system is generally prepared by hot blending, whereas the aromatic hydrocarbon-aldehyde resin-polymethylol phenol ethers resin system may be prepared by either hot or cold blending of the components. In preparing the terpolymers the polymethylol ethers may be either hot or cold blended with a hot blend of the aromatic hydrocarbon-aldehyde-ethoxyline resin or, alternatively, a hot blend of the aromatic hydrocarbon-aldehyde-polymethylol phenol ethers may be blended either hot or cold with the Epon resin.

The catalysts employed during blending, of which an 85% solution of phosphoric acid is one example, are used in an amount corresponding to from 0.1 to 2%, by weight, of the system.

In order that those skilled in the art may better understand how the present invention is practiced, the following examples are given by way of illustration and not by way of limitation. All parts are by weight. The first example is drawn to the preparation of a typical aromatic hydrocarbon-aldehyde resin.

Example 1

A mixture comprising 2,500 parts of 50% sulfuric acid and 450 parts of paraformaldehyde was stirred at a temperature of 60-65° C. for ½ hour and 795 parts of m-xylene were then added and the reaction mixture agitated at 80-85° C. for approximately 6 hours. After withdrawal of the lower acid layer, the upper product layer was steam distilled and a distillate comprising 91 parts of unreacted m-xylene were recovered leaving a viscous resin as the residue. Following the distillation of the upper product layer the resinous product was dissolved in 1,000 parts of benzene and water-washed several times. Upon removal of the benzene, there remained 898 parts of a viscous resinous material having the following analysis:

Percent C—82.74
Percent H—8.44
Percent O—8.8 (by difference)
Percent HCHO available from formal linkages= 6.0±.13%
$N_D^{25}$—1.5821 mol. wt. (cryoscopic) 580-590

When a film of this resin (catalyzed with 1%, by weight, phosphoric acid and baked for 1 hour at 175° C.) was solvent tested in toluene, it proved to be 100% soluble.

Example 2

A resin of the type prepared in Example 1 was prepared from commercial xylene in the following manner: 954 parts commercial xylene solvent, 3,000 parts of 50% sulfuric acid and 594 parts of paraformaldehyde were mixed and the reaction mixture heated to 95° C. with agitation and held at between 95 and 100° C. for 2½ hours, at the end of which period 285 parts of xylene solvent were added and the agitation stopped. After a settling period, the lower acid layer was drawn off and to the product layer were added 1,500 parts of hot water, the contents stirred and heated to 90° C. An additional separation period of 5 minutes was then permitted and the lower water layer drawn off and discarded. Another 1500 parts of hot water were added and the mixture was agitated and warmed to 90° C. and the reaction mixture made alkaline to phenophthalein indicator with 5% caustic solution. Again after a short standing period, a lower layer was drawn off and discarded and 215 parts of xylene removed by azeotropic distillation. The product was filtered and had a solids content of 77.3% corresponding to 943 parts of resin solids.

Example 3

This example illustrates the co-reaction of an ethoxyline resin with the product of Example 1. 125 parts of Epon 1007 (40% solution in diacetone alcohol-xylol 1:1) and 62.5 parts of the xylene formaldehyde resin of Example 1 (80% xylol solution) and 1.0 part of the 85% phosphoric were agitated at 125 to 135° C. for three hours. During the reaction period, 9 parts of water were collected. The mix was cut to 40% solids with diacetone alcohol-xylol (1:1) and filtered to yield 205 parts of product.

In two additional examples, the proportion of the ethoxyline resin of Example 3 was varied, so that in one case the ethoxyline resin constituted 20% of the total resin solids, and in the other 30% of the total resin solids.

Example 4

100 parts of a 50% solution in butanol of the reaction mixture comprising mixed allyl ethers of polymethylol phenols prepared in accordance with Martin Patent 2,579,330 were mixed with 62.5 parts of an 80% solution of the xylene-formaldehyde resin of Example 1 in xylene. One part of 85% phosphoric acid was added and the mixture agitated at 125° C. for one hour. During reaction 3.0 parts water were collected. The product was filtered and there were obtained 154 parts of a solution having a solids content of 61.5%.

Films of the copolymers prepared in accordance with the foregoing examples were evaluated by comparison with other films in the following manner. Various resin solutions were cut with xylol to spray consistency and steel panels were prepared in the usual fashion. All panels were baked for one-half hour at 165° C. unless otherwise specified. The copolymer of Example 4 specified as (1) was evaluated against a resin, specified as (2), prepared by blending 9 parts of a similar mixture of allyl polymethylol phenol ethers with 1 part of a polyvinyl butyral resin. The results of this comparison are shown in Table II. An ethoxyline (Epon 1007) modified aromatic hydrocarbon-aldehyde resin, specifically xylene-formaldehyde, was evaluated against the ethoxyline resin per se with the results shown in Table III. All of the films evaluated were prepared with 1% phosphoric acid as catalyst.

TABLE II

| Property | Resin 1 (50/50) | Resin 2 (90/10) |
|---|---|---|
| Color of baked films | Yellow | Yellow. |
| Sward hardness | 82-86 | 88-92. |
| Impact test | Small fine cracks. | Badly cracked—base metal exposed. |
| 10% caustic (24 hrs. at 30° C.) | No attack | No attack. |
| 10% sulfuric (24 hrs. at 30° C.) | do | Do. |
| 10% hydrochloric (24 hrs. at 30° C.) | do | Do. |
| Butanol (24 hrs. at 30° C.) | do | Do. |
| Water (24 hrs. at 30° C.) | do | Do. |
| Acetone (24 hrs. at 30° C.) | do | Do. |

The above data clearly indicates that the instant copolymer films are essentially equal to and in one respect better than the mixed allyl polymethylol phenol ethers-polyvinyl butyral resin combination in physical and chemical properties. However, the aromatic-hydrocarbon resins, because of their substantially lower cost, offer an economic advantage in the protective coating field, and in other applications.

TABLE III

| Property | Ethoxyline resin | Ethoxyline/xylene-formaldehyde resin (50/50) |
|---|---|---|
| Color of baked films | No color | No color. |
| Sward hardness | Surface too rough | 68-70. |
| Gloss | Excellent | Excellent. |
| Impact test: | | |
| 10" | do | Do. |
| 20" | do | Do. |
| 28" | do | Do. |
| Mandrel test (Adhesion) | do | Do. |
| 10% caustic (24 hrs. at 30° C.) | do | Do. |
| 10% sulfuric (24 hrs. at 30° C.) | do | Do. |
| 10% hydrochloric (24 hrs. at 30° C.) | do | Do. |
| Butanol (24 hrs. at 30° C.) | do | Do. |
| Acetone (24 hrs. at 30° C.) | Sl. softening | Do. |
| Water (24 hrs. at 30° C.) | Excellent | Do. |
| Toluene (24 hrs. at 30° C.) | Sl. softening | Do. |

The above results clearly demonstrate that aromatic hydrocarbon-aldehyde resins containing formal bridges can be readily co-reacted with ether derivatives of polymethylol phenols and with epoxy or ethoxyline type resins to yield copolymers having properties particularly desirable in protective coating applications, as well as for other end uses.

Example 5

A mixture consisting of 62.5 parts of an 80% solution of the aromatic hydrocarbon-aldehyde resin of Example 1 in xylene, 100 parts of a 50% solution of the mixed allyl polymethylol phenol ethers prepared in accordance with the Martin patent, 50 parts of butanol and 1 part of 85% phosphoric acid was held at 130 to 160° C. for a period of six hours. During this time 6.1 parts of water were collected. The solution was cut to 60% solids with xylene and filtered. The resin had a cure of 13 seconds on a 200° C. hotplate when catalyzed with 1% phosphoric acid (85% solution).

Example 6

To 100 parts of an 80% solution in xylene of the xylene-formaldehyde resin of Example 1 were added 9.4 parts of phenol and 0.8 part of 85% phosphoric acid. Over the course of 35 minutes at 130–138° C., the stroke cure dropped from greater than 120 seconds to 18 seconds and 3.4 parts of water were collected. The product was cut to 60% solids with a 50/50 mix of diacetone alcohol/xylene and then filtered. A film catalyzed with 2% phosphoric acid and baked for 1 hour at 175° C. was 93.5% insoluble in boiling toluene. This is contrasted with the complete solubility in toluene of the xylene-formaldehyde film of Example 1.

To 83.3 parts of a 60% solution of the phenol modified xylene-formaldehyde resin prepared in accordance with the first part of the example were added 125 parts of a 40% solution of Epon 1007 (diacetone alcohol/xylene as solvent) and 0.8 part of 85% phosphoric acid. This mix was heated to 120° C. and 15 parts butyl cellusolve added to clear the solution. The solution was held at 133–135° C. for 2 hours during which time 7.7 parts of water were collected and the stroke cure dropped from 12 seconds to 5 seconds when tested on a 200° C. hotplate. The mix was cut to 40% solids with a 50/50 diacetone alcohol/xylene solution and filtered.

Example 7

50 parts of the mixed allyl polymethylol phenol ethers previously described, 100 parts of butanol, 83.3 parts of a 60% solution of the phenol modified xylene-formaldehyde resin prepared in accordanc with the first part of Example 6 and 0.5 part of 85% phosphoric acid were heated to 120 to 127° C. for 2¼ hours. During this reaction period, 5 parts of water were collected and the stroke cure dropped from 20 seconds to 15 seconds when tested on a 200° C. hotplate. The resin was cut to 50% solids with xylene and filtered.

Example 8

To 100 parts of an 80% solution of the xylene-formaldehyde resin of Example 1 in xylene were added 10.2 parts of bis-phenol A, bis-(4-hydroxyphenyl) dimethylmethane, and 0.8 part of 85% phosphoric acid. The reaction mixture was held at 130 to 135° C. for four hours during which time 2 parts of water were collected and the stroke cure dropped from more than 120 seconds to 15 seconds. The product obtained was cut to 60% solids with 50/50 diacetone alcohol/xylene solution and filtered.

Example 9

To 50 parts of the mixed allyl polymethylol phenol ethers prepared in accordance with the Martin patent were added 50 parts of butanol, 83 parts of a 60% solution of the phenol modified xylene-formaldehyde resin prepared in accordance with the first part of Example 6 and 0.5 part of 85% phosphoric acid. The mix was held at 120 to 123° C. for three hours during which time 4.5 parts of water were collected and the stroke cure dropped from 60 seconds to 16 seconds. The product was cut to 50% of solids with xylene and filtered.

The resins prepared in accordance with Examples 5 to 9, inclusive, were subsequently tested for physical and chemical properties by spraying steel panels with each of the resins and baking for 1 hour at 175° C. with 1% phosphoric acid added as a catalyst. Comparison was at the same time made with the ethoxyline resin employed in the examples (Epon 1007) and a 50/50 cold blend of the ethoxyline resin with a low cost, typical commercial phenolic resin recommended for coating applications. The results of the physical and chemical tests are tabulated in Tables IV and V, respectively, in which the numbers refer to the following resins:

(1) Ethoxyline resin
(2) 50/50 mixture of mixed allyl polymethyl phenol ethers and ethoxyline resin
(3) Mixed allyl polymethylol phenol ether/xylene-formaldehyde, 50/50
(4) Mixed allyl polymethylol phenol ethers/bis phenol A modified xylene-formaldehyde, 50/50
(5) Xylene-formaldehyde/ethoxyline resin, 50/50
(6) Phenol modified xylene-formaldehyde-ethoxyline resin, 50/50
(7) Phenol modified xylene-formaldehyde/mixed allyl polymethylol phenol ethers, 50/50
(8) Commercial phenolic resin/ethoxyline resin, 50/50

TABLE IV

| Resin | Flexibility | Impact. (#2 lb. wt.) resistance | | | Abrasion resistance, mgms. loss/1,000 cycles/ 1,000 gm. load CS/10 wheels | Ultra-violet |
|---|---|---|---|---|---|---|
| | | 10" | 20" | 28" | | |
| 1 | Excellent | Excellent | Excellent | Excellent | 11.6 | Slight coloration. |
| 2 | do | do | do | do | 3.0 | Colored. |
| 3 | Very slight cracks | Badly cracked | Badly cracked | Badly cracked | 3.0 | Do. |
| 4 | do | Slight cracks | Slight cracks | Slight cracks | 3.5 | Do. |
| 5 | Excellent | Excellent | Excellent | Excellent | 3.0 | Do. |
| 6 | do | Badly cracked | Badly cracked | Badly cracked | 10.2 | Do. |
| 7 | Slight cracks | do | do | do | 8.4 | Do. |
| 8 | Excellent | Excellent | Excellent | Excellent | 10.0 | Do. |

The results of the physical tests on the instant compositions coupled with the chemical tests shown in Table V illustrate that these copolymers have properties making them satisfactory for use as drum linings, etc.

The resins corresponding by number to those tested in Table IV were tested for chemical resistance and the results tabulated in Table V. In this table the figures represent days of test.

blended with ethoxyline resins are decidedly weak toward soap, dilute alkalies and organic solvents, the instant compositions of matter give practical film-formers having properties superior to those which can be obtained by

TABLE V

| Chemical tests—Solvents | (1) | (2) | (3) | (4) | (5) | (6) | (7) | (8) |
|---|---|---|---|---|---|---|---|---|
| Toluene | 150 | 150 | 90F | 150 | 150 | 150 | 30 | 150. |
| Propylene dichloride | 8F | 150 | 150 | 150 | 150 | 150 | 30 | 150. |
| Ethyl alcohol | 4F | 150 | 150 | 150 | 150 | 150 | 30 | 1F. |
| Methyl ethyl ketone | 4F | 150 | 150 | 150 | 150 | 150 | 30 | 1F. |
| Butyl acetate | 4F | 150 | 150 | 150 | 150 | 150 | 30 | 1F. |
| Soap, 1.2% solution at 75° C | 13F | 150 | 120F | 150 | 150 | 150 | 30 | 7F. |
| Caustic: | | | | | | | | |
| 5% | 150 | 180 | 180 | 150 | 150 | 150 | 30 | 2F. |
| 20% | 150 | 180 | 180 | 150 | 150 | 150 | 30 | 2F. |
| 50% | 150 | 180 | 180 | 150 | 150 | 150 | 30 | 150. |
| Chromic acid: | | | | | | | | |
| 10% | | 90 | | 90 | | | | 20F. |
| 30% | 25F | 14F | 14F | 25F | 25F | 25F | 25F | 4F. |
| Hydrochloric acid, 37% | 6F | 73F | 12F | 6F | 55F | 12F | 1F | 120. |
| Soya acids | 90 | 180 | 180 | 90 | 180 | | | 120. |
| Humidity (days) | 120 | 120 | 120 | 41 | 120 | 120 | 41 | 120. |
| Salt spray (500 hrs.) relative rating | Excl. | Excl. | Good | Excl. | Good | Good | Excl. | Excl. |

NOTE.—F indicates the number of days to failure.

Resinous systems comprising three structural units mentioned earlier as within the scope of this invention were prepared in which the three components comprised the xylene-formaldehyde resin of Example 1, the mixed reaction product comprising allyl polymethylol phenol ethers prepared in accordance with the aforesaid Martin patent, and an ethoxyline resin, specifically Epon 1007. These polymers were prepared by two separate methods. In the first method, the xylene-formaldehyde resin prepared in accordance with the method of Example 1 was hot blended with the mixed allyl polymethylol phenol ethers and the resulting copolymer was then cold-blended with the ethoxyline resin in a 1:1 weight ratio. In the second method, terpolymers were prepared comprising the xylene-formaldehyde resins, mixed allyl ethers of polymethylol phenol and the ethoxyline resin. The terpolymers were then cold-blended with additional ethoxyline resins in varying proportions. Examples showing these resinous systems and comparison of the acetone resistance of the products are given in Table VI. The acetone resistance of the terpolymers per se are also tabulated.

TABLE VI

| Ex. No. | Composition of Di- or Ter-polymer | | | Percent ethoxyline resin cold-blended | Cure cycle | Acetone resistance |
|---|---|---|---|---|---|---|
| | Percent xylene-formaldehyde resin | Percent allyl ethers | Percent ethoxyline | | | |
| 10 | 70 | 30 | | 50 | 16″/200° C | Soft 1 hr. |
| 11 | 60 | 40 | | 50 | do | Excl. 72 hrs. |
| 12 | 50 | 50 | | 50 | do | Do. |
| 13 | 81 | 9 | 10 | 40 | do | Do. |
| 14 | 72 | 8 | 20 | 30 | do | Do. |
| 15 | 72 | 18 | 10 | 40 | do | Do. |
| 16 | 64 | 16 | 20 | 30 | do | Do. |
| 17 | 81 | 9 | 10 | | 25″/200° C | Do. |
| 18 | 72 | 8 | 20 | | do | Do. |
| 19 | 72 | 18 | 10 | | 20″/200° C | Soft 72 hrs. |
| 20 | 64 | 16 | 20 | | do | Do. |

Although the films of Examples 19 and 20, inclusive, that is, the terpolymers per se, were rendered soft by acetone after 72 hours, it was found that the polymers employed in these examples were nevertheless excellent film formers as no cratering tendency was observed. These films can, therefore, be used to advantage in applications requiring less stringent chemical resistance but where absence of cratering is of the essence. It is also apparent that the terpolymers can be cold-blended with an ethoxyline resin to give solvent resistance coatings having a satisfactory range of physical properties.

Whereas typical commercial phenolic resins when cold-using a typical low cost commercial phenolic resin. Their properties are essentially equal to, and in some respects, better than, those which can be obtained by using a special grade phenolic of the mixed allyl polymethylol phenol ether type described in the Martin patent. The properties of xylene-formaldehyde co-resins are indeed surprising when it is realized that the xylene-formaldehyde resin per se is a non-curing thermoplastic material whereas both the mixed allyl ethers of polymethylol phenol and low cost conventional phenolic compositions are thermosetting materials. Furthermore, it is emphasized that the xylene-formaldehyde resins are appreciably cheaper than either the ordinary commercial phenolic resin and, of course, the special type phenolics.

The compositions of this invention have a wide range of utility in coating compositions, i. e., can linings, drum linings, etc. Additionally, they may be used as protective coatings for costume jewelry, brass articles, conduits, motors, etc. They may also be used as casting or potting compositions, as laminating varnishes, as an ingredient in wire enamels, etc.

What I claim as new and desire to secure by Letters Patent of the United States is:

1. A resinous composition of matter comprising the reaction product of (1) an aromatic hydrocarbon-aldehyde resin, said aromatic hydrocarbon having an alkyl substituent, and (2) a composition selected from the class consisting of a (a) a composition having the general formula

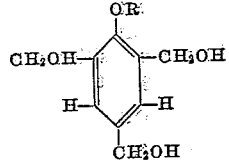

wherein R is a radical selected from the group consisting of saturated and ethylenically unsaturated aliphatic hydrocarbon radicals, (b) a composition comprising (a) and a composition corresponding to the general formula

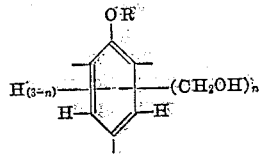

where R has the meaning given above and $n$ is an integer equal to from 1 to 2, inclusive, and (c) a complex ethoxyline resin containing epoxy groups and comprising a polyether derivative of a polyhydric organic compound selected from the class consisting of polyhydric alcohols and phenols containing at least two phenolic hydroxy groups, the aromatic hydrocarbon-aldehyde resin comprising about 30 to 70 percent, by weight, of the total weight of the reactants.

2. A resinous composition of matter comprising the reaction product of (1) a resinous composition comprising an aromatic hydrocarbon-aldehyde resin, said aromatic hydrocarbon having an alkyl substituent, and (2) a composition selected from the class consisting of (a) a composition having the general formula

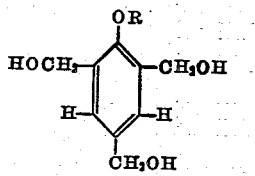

wherein R is a radical selected from the group consisting of saturated and ethylenically unsaturated aliphatic hydrocarbon radicals, (b) a composition comprising (a) and a composition corresponding to the general formula

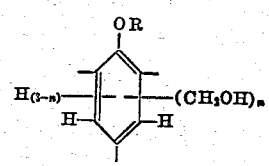

where R has the meaning given above and n is an integer equal to from 1 to 2, inclusive, and (c) a complex ethoxyline resin containing epoxy groups and comprising a polyether derivative of a polyhydric organic compound selected from the class consisting of polyhydric alcohols and phenols containing at least two phenolic hydroxy groups, the aromatic hydrocarbon-aldehyde resin comprising about 30 to 70 percent, by weight, of the total weight of the reactants.

3. A resinous composition of matter comprising the reaction product of (1) a phenol modified aromatic hydrocarbon-aldehyde resin, said aromatic hydrocarbon having an alkyl substituent, and (2) a composition selected from the class consisting of (a) a composition having the general formula

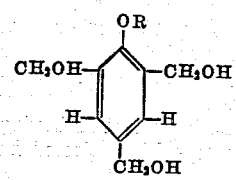

wherein R is a radical selected from the group consisting of saturated and ethylenically unsaturated aliphatic hydrocarbon radicals, (b) a composition comprising (a) and a composition corresponding to the general formula

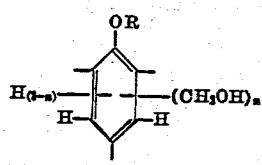

where R has the meaning given above, and n is an integer equal to from 1 to 2, inclusive, and (c) a complex ethoxyline resin containing epoxy groups and comprising a polyether derivative of a polyhydric organic compound selected from the class consisting of polyhydric alcohols and phenols containing at least two phenolic hydroxy groups, the modified aromatic hydrocarbon-aldehyde resin comprising about 30 to 70 percent, by weight, of the total weight of the reactants.

4. A resinous composition of matter comprising the reaction product of (1) an aromatic hydrocarbon-aldehyde resin, said aromatic hydrocarbon having an alkyl substituent, and (2) a composition comprising a mixture of compounds having the general formulae

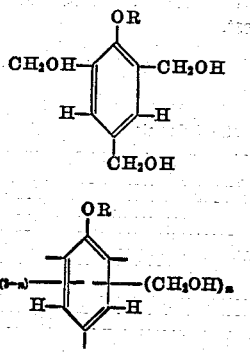

and

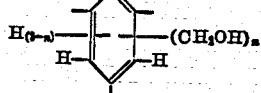

where in both compounds R is a radical selected from the group consisting of ethylenically saturated and unsaturated aliphatic hydrocarbon radicals, and n in the second compound is an integer equal to from 1 to 2, inclusive, the aromatic hydrocarbon-aldehyde resin comprising about 30 to 70 percent, by weight, of the total weight of the reactants.

5. A resinous composition of matter comprising the reaction product of (1) a phenol-modified aromatic hydrocarbon-aldehyde resin, said aromatic hydrocarbon having an alkyl substituent, and (2) a composition comprising a mixture of compounds having the general formulae

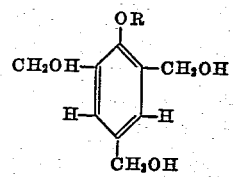

and

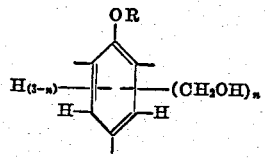

where in both compounds R is a radical selected from the group consisting of saturated and ethylenically unsaturated aliphatic hydrocarbon radicals, and n in the second compound is an integer equal to from 1 to 2, inclusive, the modified aromatic hydrocarbon-aldehyde resin comprising about 30 to 70 percent, by weight, of the total weight of the reactants.

6. A resinous composition of matter comprising the reaction product of (1) a xylene-formaldehyde resin and (2) a composition comprising a mixture of

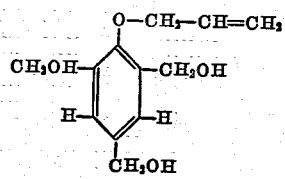

and

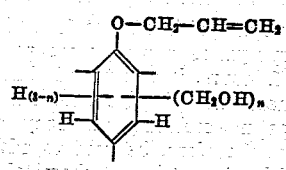

n in the second compound being an integer equal to from 1 to 2, inclusive, the xylene-formaldehyde resin comprising about 30 to 70 percent, by weight, of the total weight of the reactants.

7. A resinous composition of matter comprising the reaction product of (1) a phenol-modified xylene-formaldehyde resin, and (2) a composition comprising a mixture of

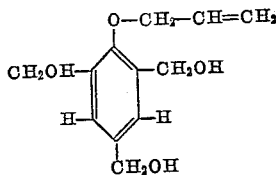

and

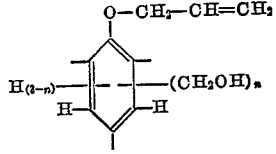

n in the second compound being an integer equal to from 1 to 2, inclusive, the modified xylene-formaldehyde resin comprising about 30 to 70 percent, by weight, of the total weight of the reactants.

8. A resinous composition of matter comprising the reaction product of (1) a resinous composition comprising an aromatic hydrocarbon-aldehyde resin, said aromatic hydrocarbon having an alkyl substituent, and (2) a complex ethoxyline resin containing epoxy groups and comprising a polyether derivative of a polyhydric organic compound selected from the class consisting of polyhydric alcohols and phenols containing at least two phenolic hydroxy groups, the aromatic hydrocarbon-aldehyde resin comprising about 30 to 70 percent, by weight, of the total weight of the reactants.

9. A resinous composition of matter comprising the reaction product of (1) a phenol-modified aromatic hydrocarbon-aldehyde resin, said aromatic hydrocarbon having an alkyl substituent, and (2) a complex ethoxyline resin containing epoxy groups and comprising a polyether derivative of a polyhydric organic compound selected from the class consisting of polyhydric alcohols and phenols containing at least two phenolic hydroxy groups, the modified aromatic hydrocarbon-aldehyde resin comprising about 30 to 70 percent, by weight, of the total weight of the reactants.

10. A resinous composition of matter comprising the reaction product of (1) a xylene-formaldehyde resin and (2) a complex ethoxyline resin containing epoxy groups and comprising a polyether derivative of a polyhydric organic compound selected from the class consisting of polyhydric alcohols and phenols containing at least two phenolic-hydroxy groups, the xylene-formaldehyde resin comprising about 30 to 70 percent, by weight, of the total weight of the reactants.

11. A resinous composition of matter comprising the reaction product of (1) a phenol-modified xylene-formaldehyde resin, and (2) a complex ethoxylene resin containing epoxy groups and comprising a polyether derivative of a polyhydric organic compound selected from the class consisting of polyhydric alcohols and phenols containing at least two phenolic-hydroxy groups, said modified xylene-formaldehyde resin comprising about 30 to 70 percent, by weight, of the total weight of the reactants.

12. The resinous composition of claim 11 wherein the xylene-formaldehyde resin is modified with phenol.

13. The resinous composition of claim 11 wherein the xylene-formaldehyde resin is modified with bis-(4-hydroxyphenyl) dimethylmethane.

14. A resinous composition of matter comprising the reaction product of (1) an aromatic hydrocarbon-aldehyde resin, said aromatic hydrocarbon having an alkyl substituent, (2) a composition comprising

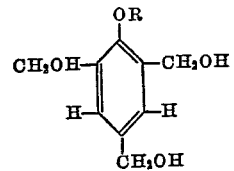

and

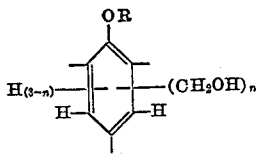

wherein both compounds R is a radical selected from the group consisting of saturated and ethylenically unsaturated aliphatic hydrocarbon radicals, and n is an integer equal to from 1 to 2, inclusive, and (3) a complex ethoxyline resin containing epoxy groups and comprising a polyether derivative of a polyhydric organic compound selected from the class consisting of polyhydric alcohols and phenols containing at least two phenolic hydroxy groups the aromatic hydrocarbon-aldehyde resin comprising about 30 to 70 percent, by weight, of the total weight of the reactants.

15. A resinous composition of matter comprising the reaction product of (1) a xylene-formaldehyde resin, (2) a composition comprising

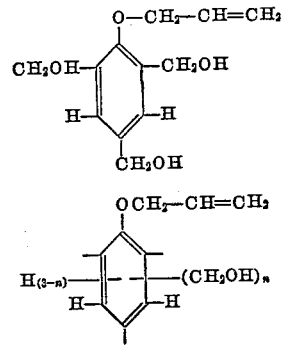

n in the second compound being an integer equal to from 1 to 2, inclusive, and (3) a complex epoxide resin comprising the reaction product of bis-(4-hydroxyphenyl) dimethylmethane and epicholorohydrin, the xylene-formaldehyde resin comprising about 30 to 70 percent, by weight, of the total weight of the reactants.

References Cited in the file of this patent

UNITED STATES PATENTS

| | | |
|---|---|---|
| 2,330,827 | Kester | Oct. 5, 1943 |
| 2,506,486 | Bender et al. | May 2, 1950 |
| 2,579,329 | Martin | Dec. 18, 1951 |

FOREIGN PATENTS

| | | |
|---|---|---|
| 900,092 | France | Sept. 18, 1944 |
| 879,441 | Germany | June 11, 1953 |